(12) United States Patent
Hollick et al.

(10) Patent No.: US 8,130,731 B2
(45) Date of Patent: Mar. 6, 2012

(54) METHOD, NETWORK NODES AND SYSTEM FOR BROADCAST TRANSMISSION OF DATA

(75) Inventors: Matthias Hollick, Darmstadt (DE); Parag Sudhir Mogre, Darmstadt (DE); Christian Schwingenschlögl, Putzbrunn (DE); Andreas Ziller, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 555 days.

(21) Appl. No.: 12/308,602

(22) PCT Filed: May 21, 2007

(86) PCT No.: PCT/EP2007/054892
§ 371 (c)(1),
(2), (4) Date: Dec. 18, 2008

(87) PCT Pub. No.: WO2008/000554
PCT Pub. Date: Jan. 3, 2008

(65) Prior Publication Data
US 2011/0206020 A1 Aug. 25, 2011

(30) Foreign Application Priority Data
Jun. 30, 2006 (DE) .......................... 10 2006 030 297

(51) Int. Cl.
*H04J 3/00* (2006.01)
*H04J 3/06* (2006.01)
*H04W 4/00* (2009.01)
*H04B 7/212* (2006.01)
*H04L 12/43* (2006.01)

(52) U.S. Cl. ........ 370/337; 370/314; 370/321; 370/347; 370/442; 370/461; 370/468; 370/498; 370/508; 370/519

(58) Field of Classification Search .................. 370/314, 370/321, 336, 337, 345, 347, 442, 458, 461, 370/468, 498, 508, 519
See application file for complete search history.

(56) References Cited

U.S. PATENT DOCUMENTS
5,752,193 A * 5/1998 Scholefield et al. ....... 455/452.2
(Continued)

FOREIGN PATENT DOCUMENTS
CN 1697415 A 11/2005
(Continued)

OTHER PUBLICATIONS
Pedro Francisco Robles Rico, Investigation of IEEE standard 802.16 Medium Access Control (MAC) layer in Distributed Mesh Networks and comparison with IEEE 802.11 ad-hoc network, Thesis, XX, XX, [Online] Bd. LiTH-ISY-EX-6/3891, May 2006, pp. 1-73, XP007903314.

*Primary Examiner* — Ronald Abelson

(57) ABSTRACT

Disclosed are methods for broadcast transmission of data in frames having multiple time slots, from one transmitting node to multiple receiving nodes in a network, having the following steps: The sending out of at least one broadcast request message from the transmitter node to the receiver nodes, wherein the time slots available to the transmitter node for data transmission are indicated; the transmitting back of time-slot granting messages from the receiving nodes, wherein at least one of the time-slots available to the respective receiver node for data transmission is in each case indicated jointly with one at the transmitter node; the sending out of a confirmation message from the transmitter node to the neighboring receiving nodes, wherein all of the receiving nodes are indicated in the time-slot granting messages jointly with the time-slots available at the transmitter node; the performing of a broadcast transmission of the data from the transmitter node to the receiver nodes in the jointly available time slots.

18 Claims, 9 Drawing Sheets

U.S. PATENT DOCUMENTS

| | | | |
|---|---|---|---|
| 5,812,545 A * | 9/1998 | Liebowitz et al. | 370/337 |
| 6,195,688 B1 * | 2/2001 | Caldwell et al. | 709/208 |
| 6,477,151 B1 * | 11/2002 | Oksala | 370/314 |
| 6,665,311 B2 | 12/2003 | Kondylis | |
| 2005/0003856 A1 * | 1/2005 | Jang et al. | 455/553.1 |
| 2006/0105773 A1 * | 5/2006 | Lin et al. | 455/452.1 |

FOREIGN PATENT DOCUMENTS

| | | |
|---|---|---|
| EP | 1351437 A1 | 10/2003 |
| EP | 1594268 A2 | 11/2005 |
| WO | WO 0221769 A2 | 3/2002 |
| WO | WO2006043902 * | 4/2006 |

* cited by examiner

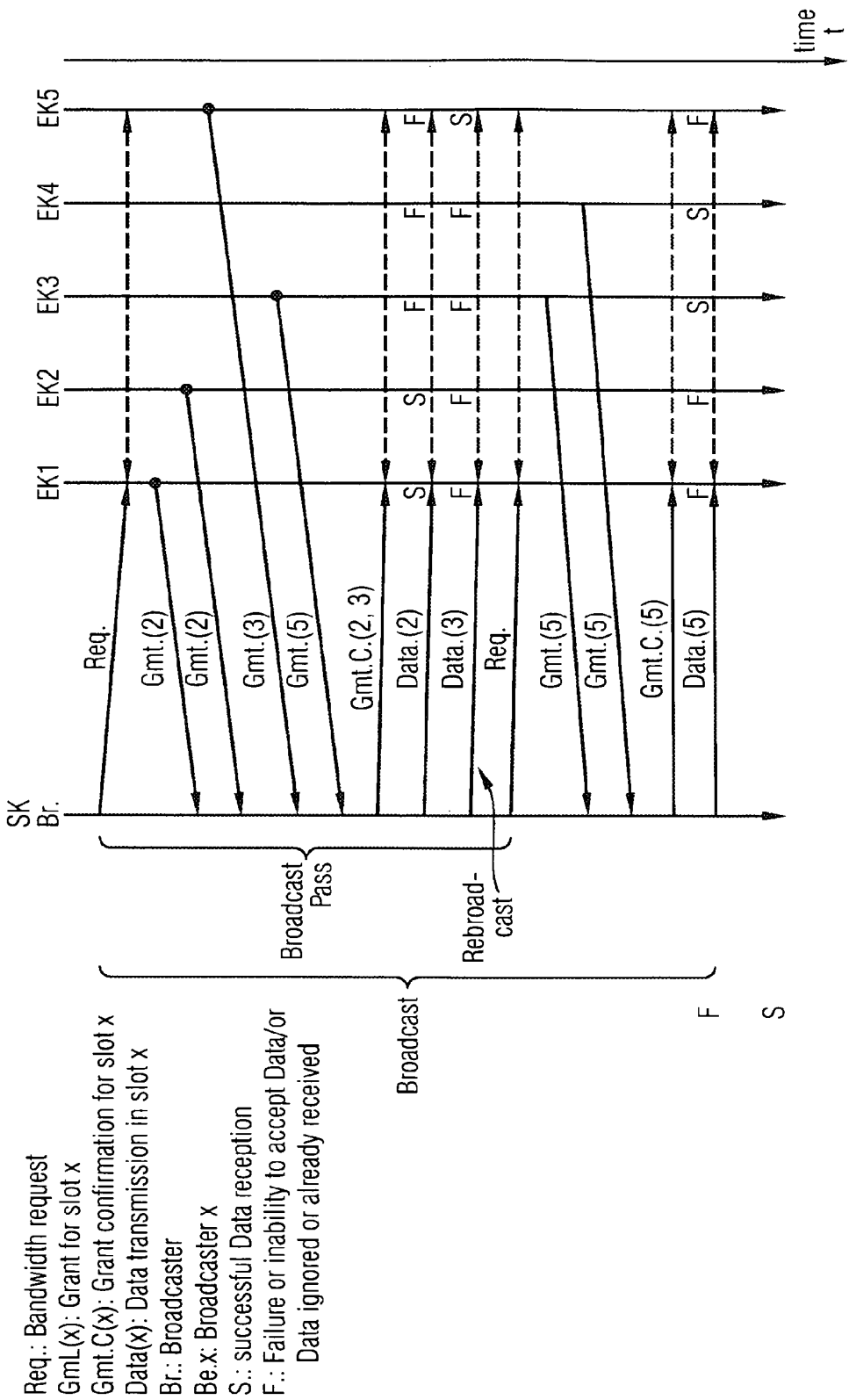

FIG 5A

| Identifier | Size |
| --- | --- |
| Broadcast ID | 8 bits |
| Demand Level | 8 bits |
| Demand Persistence | 3 bits |
| Broadcast Flag | 1 bit |

Table 1  Message format of MSH-DSCH: Request_IE

| Identifier | Size |
| --- | --- |
| Broadcast ID | 8 bits |
| Receiver ID | 16 bits |
| Start Frame Number | 8 bits |
| Minislot Start | 8 bits |
| Minislot Range | 8 bits |
| Direction | 1 bit |
| Persistence | 3 bits |
| Channel | 4 bits |

Table 2  Message format of MSH-DSCH: Grant_IE

| Identifier | Size |
| --- | --- |
| Start Frame Number | 8 bits |
| Minislot Start | 8 bits |
| Minislot Range | 8 bits |
| Direction | 2 bits |
| Persistence | 3 bits |
| Channel | 4 bits |

Table 3  Message format of MSH-DSCH: Availability_IE

| Identifier | Size |
| --- | --- |
| Next Xmt Mx | 5 bits |
| Xmt holdoff exponent | 3 bits |
| No_Sched_Entries | 8 bits |
| for (i=0; i<No_Sched_Entries; i++) | |
| { | |
|     Neighbor Node ID | 16 bits |
|     Neighbor Next Mx | 5 bits |
|     Neighbor Xmt holdoff exponent | 3 bits |
| } | |

Table 4  Message format of MSH-DSCH: Scheduling_IE

FIG 5B

| Identifier | Size |
|---|---|
| Management Message Type = 41 | 8 bits |
| Coordination Flag | 1 bit |
| Grant/Request Flag | 1 bit |
| Sequence Counter | 6 bits |
| No_Requests | 4 bits |
| No_Availabilities | 4 bits |
| No_Grants | 6 bits |
| reserved | 2 bits |
| If (Coordination Flag == 0) { | |
|     MSH-DSCH_Scheduling_IE | variable |
| } | |
| for (i=0; i<No_Requests; i++) { | |
|     MSH-DSCH_Request_IE | 16 bits |
| } | |
| for (i=0; i<No_Availabilities; i++) { | |
|     MSH-DSCH_Availability_IE | 32 bits |
| } | |
| for (i=0; i<No_Grants; i++) { | |
|     MSH-DSCH_Grant_IE | 40 bits |
| } | |

Table 5  Message format of MSH-DSCH message

| Algorithm Determining a transmission interval for grant IEs |
|---| function GETINTERVAL(O,A,r) ▷ O monitored intervals, A available intervals, r demand // Check whether monitored interval can be used ⟨Calculate ⟨$o_1, o_2,...o_{|O|}$⟩ as sorted sequence of O.so that following holds start $(o_i)$ start $(o_{i+1})$, if start $(o_i)$=start $(o_{i+1})$ then duration $(o_i) \le$ durationt $(o_{i+1})$⟩ match ← null
    $counter_{max}$ ← 0 for i ← 1 to |O| do
      if i=1 ∨ $o_{i-1} = o_i$ then
        if i>1 ∧ counter > $counter_{max}$ ∧ ⟨$o_{i-1}$ is available for receiving ⟩ then
          match ← $o_{i-1}$
          $counter_{max}$ ← counter
        end if
        counter ← 1
      else
        counter ← counter + 1
      end if
    end for if counter > $counter_{max}$ ∧ ⟨$o_{|O|}$ is available for receiving ⟩ then
      match ← $o_{|O|}$
      $counter_{max}$ ← counter
    end if if match ≠ null then
      return match ▷ A usable monitored interval was found
    end if // No usable monitored interval was found
    // Seek available interval that does not overlap any monitored interval S ← A \ O
    match ← (Seek interval from S. that satisfies request r)

if match = null then
      return match ▷ An overlap free interval was found
    end if // No usable overlap-free interval was found
    // Seek any available interval return (Seek interval from A. that satisfies request r)
end function

FIG 7

METHOD, NETWORK NODES AND SYSTEM FOR BROADCAST TRANSMISSION OF DATA

CROSS REFERENCE TO RELATED APPLICATIONS

This application is the US National Stage of International Application No. PCT/EP2007/054892, filed May 21, 2007 and claims the benefit thereof The International Application claims the benefits of German application No. 10 2006 030 297.4 filed Jun. 30, 2006, both of the applications are incorporated by reference herein in their entirety.

FIELD OF INVENTION

The invention relates to a method and to a network node for broadcast transmission of data with guaranteed data delivery in a network, in particular in a mesh data network.

BACKGROUND OF THE INVENTION

The IEEE 802.16 standard specifies the air interface including Medium Access Control (MAC) and various specifications of the physical layer of a broadband wireless access (BWA) system for supporting various services. The IEEE 802.16 standard specifies two operating modes, namely a multipoint operating mode (PMP: point-to-multipoint mode) and an optional mesh operating mode.

In PMP mode, it is only possible for subscriber stations to communicate with a base station. The individual subscriber stations, for example mobile terminals, cannot communicate with one another directly. The individual subscriber stations must therefore be within the direct transmission range of the base station in order to obtain access to the network.

The other operating mode specified in the 802.16 standard is referred to as mesh or MSH mode. The main difference between PMP mode and MSH mode is that in PMP mode, the data is exchanged exclusively between the base station and the subscriber stations and no data can be transmitted directly between subscriber stations. In mesh mode, data can be exchanged directly between a subscriber station and the base station by routing the data via other subscriber stations. Data can also be exchanged directly between different subscriber stations. The advantage of mesh mode is that it permits indirect data communication between a subscriber device and the base station, i.e. it is possible to provide fewer base stations when implementing the network. Another advantage is that the base stations have a greater range extending beyond the physical broadcast range of their own network adapter.

The mesh data networks based on the 802.16-2004 standard do not describe any mechanism for broadcasting or multicasting data. In the case of a broadcast data transmission, a transmitting node sends data to all (broadcast) or to a specific subgroup of neighboring nodes (multicast). In order for a transmitting node to be able to send data to the neighboring nodes, according to the 802.16-2004 standard it must send its broadcast messages sequentially, i.e. the transmitting node sends the data as a unicast initially to a first receiving node and then subsequently to a further receiving node etc. until all neighboring nodes have been reached. The bandwidth required for this increases in line with the number of neighboring nodes. The time delay of the transmitted broadcast messages also rises. The time delay for subsequent messages likewise increases as a result of the effort expended for transmitting the broadcast message.

Distributed scheduling as used in mesh mode allows the node to coordinate its data transmissions in a distributed manner in its two-hop neighborhood, i.e. with nodes that are no further than two transmission hops or links away from the node. This enables data to be transferred freely without collisions or bottlenecks. However, the mesh mode defined in the IEEE 802.16 standard only supports requesting and granting of one bandwidth for a unicast data transmission, that is to say data transmission in which the data is received by exactly one neighboring node. The IEEE 802.16 standard does not support broadcast data transmission for mesh mode, that is to say successful transmission of a single data unit to multiple receiving nodes. For a successful broadcast data transmission, with the IEEE 802.16 standard a transmitting node would have to perform a data transmission reservation in a time slot in which all its neighboring nodes are ready to receive. The readiness of neighboring nodes to receive depends however on the reserved data transmissions in the neighborhood of the respective neighboring node. It is therefore not possible to base the selection of a time slot for data transmission solely on the knowledge of the state of the neighboring nodes of the transmitting node that wishes to perform a broadcast data transmission. In order to send data to all its neighboring nodes therefore, the transmitting node must sequentially send the data to its neighboring nodes in a unicast data transmission.

It is often necessary to transmit the same data to multiple receivers. For instance, in the case of reactive routing methods, protocol messages are often sent to multiple neighbors in order to determine a path to a destination. In this way the messages rapidly propagate throughout the entire network and the destination can be found more quickly. Using the conventional form of unicast data transmission has the disadvantage here that the data has to be transmitted additionally for each receiver. This is however very inefficient, as the same data is always transmitted. With a broadcast method on the other hand, one data transmission could reach multiple receivers simultaneously. Unfortunately, 802.16 does not currently provide any support for broadcasting data packets. There is one broadcast, but it is intended solely for transmitting MAC management in control subframe messages. This mechanism is not suitable for the actual data traffic. It controls the sending of data packets to multiple receivers, guaranteeing collision-free transmission.

SUMMARY OF INVENTION

It is therefore the object of the present invention to provide a method and a network node for broadcast transmission of data in networks, in particular in mesh networks.

According to the invention, this object is achieved by a method and by a network node as claimed in the claims.

The invention provides a method for broadcast transmission of data in frames having multiple time slots, from one transmitting node to multiple receiving nodes in a network, said method having the following steps:

sending out at least one broadcast request (MSH-DSCH request IE) in an MSH-DSCH message in the scheduling control subframe from the transmitting node to all receiving nodes, wherein the time slots available to the transmitting node for data transmission are indicated in groups in the MSH-DSCH message;

transmitting back one or more time-slot granting messages (MSH-DSCH grant IE as grant) from the receiving nodes, wherein a group of at least one time slot available to the respective receiving node for data transmission is in each case indicated jointly with one available to the transmitting node;

sending out a confirmation message (MSH-DSCH grant IE as grant confirmation) from the transmitting node to the neighboring receiving nodes, wherein all time slots available to the receiving nodes jointly with the transmitting node are indicated in the time-slot granting messages (MSH-DSCH grant IE);

performing a broadcast transmission of the data from the transmitting node to the receiving nodes in the jointly available time slots.

In one preferred embodiment, the request message (MSH-DSCH request IE) sent out by the transmitting node has an associated transmission ID.

In one preferred embodiment, the time-slot granting message (MSH-DSCH grant IE as grant) transmitted back from a receiving node has a transmission ID that indicates to which request message received by the receiving node it belongs.

In one preferred embodiment, the time-slot granting message (MSH-DSCH grant IE) transmitted back from a receiving node has a receiver ID that indicates the receiving node to which it belongs.

In one preferred embodiment, the transmitting node sends out one or more confirmation messages (MSH-DSCH grant IE as grant confirmation) with a transmission ID, wherein the confirmation messages (MSH-DSCH grant IE as grant confirmation) contain all groups of successive time slots which were previously received in confirmation messages (MSH-DSCH grant IE as grant), which are marked with the specific transmission ID, from the receiving nodes, and which are permitted for a confirmation.

Permitted for confirmation from the transmitting node (by means of MSH-DSCH grant IE as grant confirmation) are the groups of time slots that do not contain any time slots which are contained in a confirmation message (MSH-DSCH grant IE as grant) received from the transmitting node with unsuitable transmission ID or unsuitable broadcaster ID from the receiving node, or which do not contain any time slots for which a confirmation message (MSH-DSCH grant IE as grant confirmation) was previously sent from the transmitting node.

A transmission ID is unsuitable if it does not match the transmission ID that was previously specified by the transmitting node in MSH-DSCH request IE. A broadcaster ID is unsuitable if it does not match the node ID of the transmitting node that is also entered in its transmitted MAC-PDU.

In one preferred embodiment, the nodes have node identifiers (node IDs) that are transmitted in the messages sent from the nodes in each case.

In one preferred embodiment, following the sending out of a request message (MSH-DSCH request IE), the transmitting node temporarily stores the node IDs of the receiving nodes from which the transmitting node has received a time-slot granting message (MSH-DSCH grant IE) for said broadcast request message.

In one preferred embodiment, if the proportion of receiving nodes that have transmitted back a time-slot granting message (MSH-DSCH grant IE) in response to a request message (MSH-DSCH request IE) of the transmitting node is below a definable threshold, the transmitting node SK retransmits the respective broadcast request message (MSH-DSCH request IE).

In one preferred embodiment, the receiving node sends out time-slot granting messages (MSH-DSCH grant IE) which each have a transmission ID that is not identical to the transmission ID indicated in the request message of the transmitting node, so that the transmitting node does not perform any broadcast data transmission in said time slots if none of the time slots indicated in the request message (MSH-DSCH request IE) is also available for a receiving node because it is receiving data from other nodes.

In one preferred embodiment, the receiving node in turn sends a time-slot granting message (MSH-DSCH grant IE as grant) with said transmission ID, wherein indicated in said time-slot granting message (MSH-DSCH grant IE as grant) are the same time slots as are indicated in the time-slot granting message (MSH-DSCH grant IE) received from the other receiving node if, after receiving a request message (MSH-DSCH request IE) with an associated transmission ID, a receiving node receives a time-slot granting message (MSH-DSCH grant IE) from another receiving node with an identical transmission ID.

In one preferred embodiment, the receiving node receives multiple groups of grant messages (MSH-DSCH grant IE as grant) for which it holds that the union of all time slots from the grant messages of a group of grant messages is identical to the same union of time slots from other groups of received grant messages, wherein the receiving node confirms the combined groups of time slots from the groups of received grant messages with a confirmation message (MSH-DSCH grant IE as grant confirmation) specifically whenever it has not previously sent a confirmation for the same set union of time slots and when said set union is permitted for a confirmation from the transmitting node SK.

In one preferred embodiment, the network is formed by a mesh network.

In one preferred embodiment, the network is formed by a WiMax network.

In one preferred embodiment, the network is formed by a fixed network.

In one preferred embodiment, the nodes are formed by mobile terminals or base stations.

The invention furthermore provides a network node for broadcast transmission of data in frames having multiple time slots (TS) to multiple receiving nodes (EK) in a network, having a processing means and a transmitting/receiving means that are designed in such a way that at least one broadcast request (MSH-DSCH request IE) is sent from the network node to the receiving nodes (EK) in which the time slots (TS) available to the network node for data transmission are indicated;

the network node receives time-slot granting messages (MSH-DSCH grant IE) transmitted back from the receiving nodes (EK), which messages indicate at least one time slot (TS) that the respective receiving node (EK) and the transmitting node (SK) jointly have available for data transmission;

the network node sends out to the receiving nodes (EK) a confirmation message (MSH-DSCH grant IE as grant confirmation) in which all time slots (TS) marked as available by the receiving nodes (EK) jointly with the transmitting node (SK) are indicated in the various time-slot granting messages (MSH-DSCH grant confirmation IE), wherein the network node subsequently performs a broadcast data transmission of the data to all receiving nodes (EK) in said jointly available time slots (TS).

The system has at least one neighboring node according to the invention.

In one preferred embodiment, the network is a mesh network.

In one preferred embodiment, the network is a WiMax mesh network.

In one preferred embodiment, the nodes are mobile terminals or base stations.

BRIEF DESCRIPTION OF THE DRAWINGS

Preferred embodiments of the method according to the invention will now be described with reference to the accompanying drawings in order to illustrate key features of the invention.

FIG. 4: shows a signal diagram for an example to illustrate the functioning of the method according to the invention;

FIGS. 5A, 5B: show tables for possible message formats in accordance with the method according to the invention;

FIG. 7: shows one possible embodiment of an algorithm for determining the interval for broadcast reception according to the invention;

DETAILED DESCRIPTION OF INVENTION

With the method according to the invention, information elements (IE) for reserving bandwidth for the broadcast are copied from unicasting. The link ID data field used in unicasting is used for broadcast IE in all message formats as broadcast ID or transmission ID respectively with a different function.

In addition, in the broadcast request message (MSH-DSCH: Request_IE) a bit which, although provided in the standard, was previously unused is used for marking the request IE as a broadcast request IE (broadcast flag). An additional 16-bit field is added in the grant message MSH-DSCH: Grant_IE, which field can store a node identifier (node ID).

In one preferred embodiment of the method according to the invention, information elements (MSH-DSCH request IE, MSH-DSCH grant IE) do not form any independent protocol messages, but rather are elements of an MSH-DSCH message that contains said elements. Available time slots TS are preferably not added to the MSH-DSCH request IE, but are likewise elements of the MSH-DSCH message.

A confirmation message is preferably formed by an MSH-DSCH: Grant_IE with a set flag (direction bit).

Information elements IE in MSH-DSCH messages are transmitted to all neighboring nodes in the scheduling control subframe. Receiving is performed using a decentralized method which unambiguously assigns transmission availabilities in the scheduling control subframe to exactly one transmitter SK.

Time slots TS are always indicated in groups of multiple successive time slots in a transmission frame. Time slots TS of a group can also be valid for multiple transmission frames in succession. The number of successive time slots TS within one transmission frame is a natural number which is greater than 0 and less than the number of maximum time slots of a transmission frame. The number of successive transmission frames in which time slots TS of a group are valid is either 1, 2, 4, 8, 32, 128 or infinite. A group may also consist of a single time slot. Every time slot TS of a group is exactly equal to four successive transmission frames. MSH-DSCH request IE, MSH-DSCH grant IE and MSH-DSCH availability IE are information elements that are added to MSH-DSCH messages, they do not represent complete protocol messages per se. When reference is made in the text below to the sending of an MSH-DSCH request IE, MSH-DSCH grant IE or MSH-DSCH availability IE, this implicitly refers to the sending of an MSH-DSCH message with the respective IE. MSH-DSCH messages are transmitted in the scheduling control subframe. Transmission therein guarantees that the MSH-DSCH messages are received by all neighboring nodes.

Figure 1:
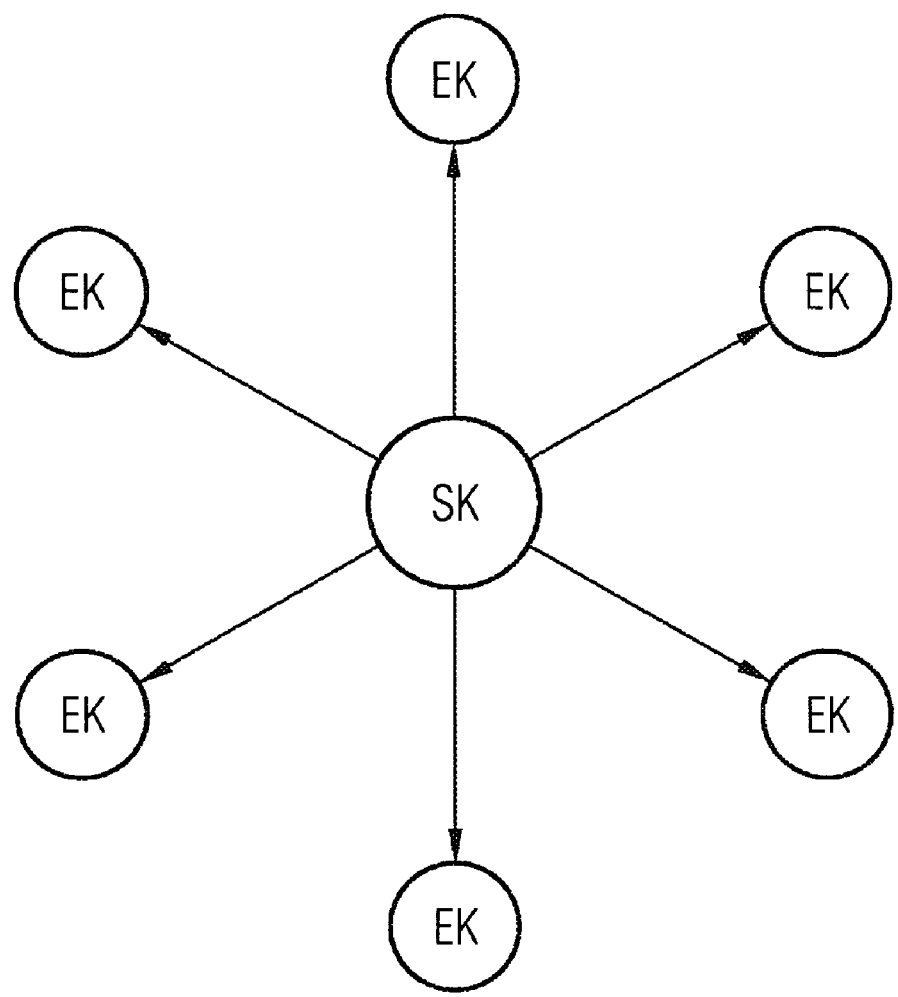
FIG. 1: shows a diagram illustrating a broadcast data transmission with the method according to the invention.

Using the method according to the invention it is possible for a transmitting node SK to simultaneously perform a broadcast transmission to multiple receiving nodes EK, as is schematically illustrated in FIG. 1. In this case, broadcast transmission of the data can be directed either in a first alternative to all nodes located in the neighborhood or, as a second alternative, can be performed to a selected subgroup of said neighboring nodes (multicast). In the case of the second alternative, the broadcast transmission can be repeated a number of times in order to maximize the number of receiving nodes EK reached.

Figure 2:
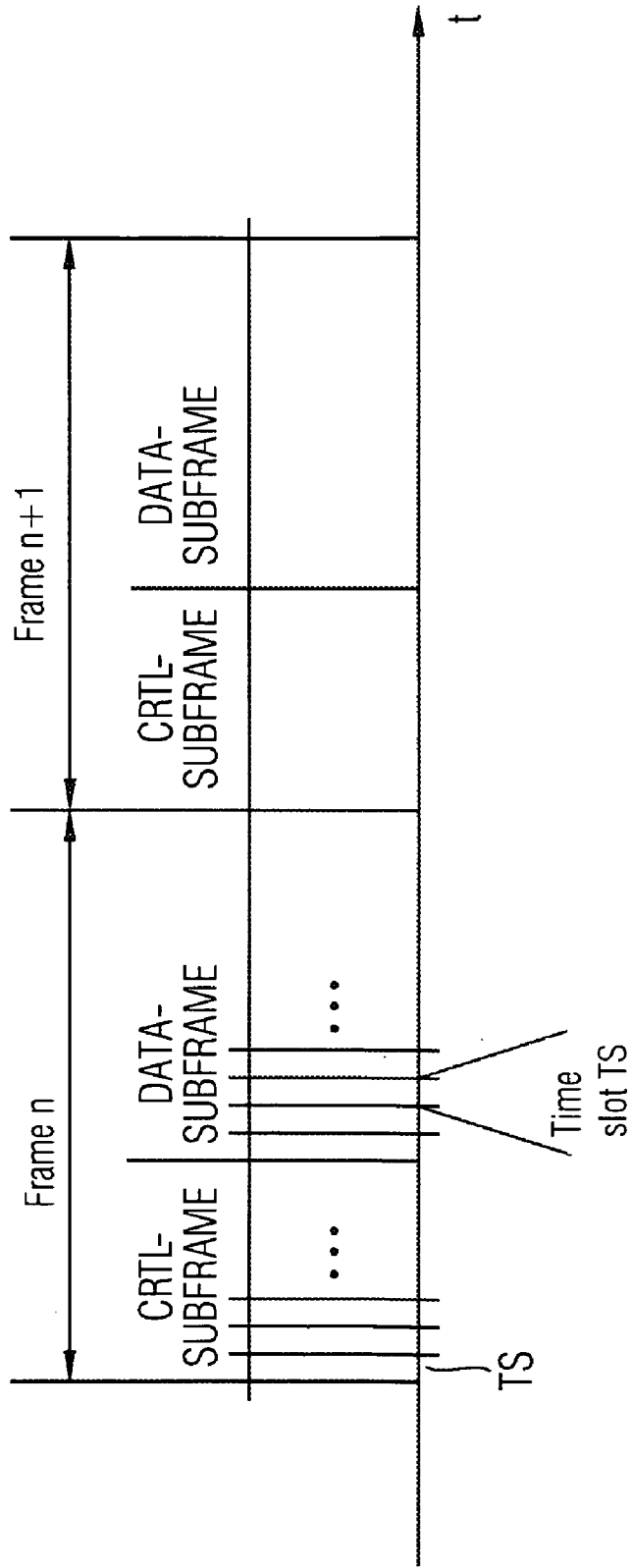
FIG. 2: shows a diagram illustrating the data structure of a frame used for broadcast data transmission with the method according to the invention.

The data is transmitted here in frames having multiple time slots, as is illustrated in FIG. 2. Each frame is divided into a control subframe and into a data subframe, which in turn are subdivided into time slots TS. The time slots TS have the same duration. Control messages are exchanged between the nodes in the control subframe. The actual data is transmitted in the time slots of the data subframe. A data subframe has for example 98 time slots which can be identified by means of the number of the frame (frame number) in which they are transmitted and their position in the frame. Several contiguous (range) time slots that are available across a plurality of (persistence) frames form an interval or a group of time slots TS respectively. For example, four contiguous time slots beginning with time slot no. 15 across eight frames form a group of 4·8=32 time slots TS.

Figure 3:
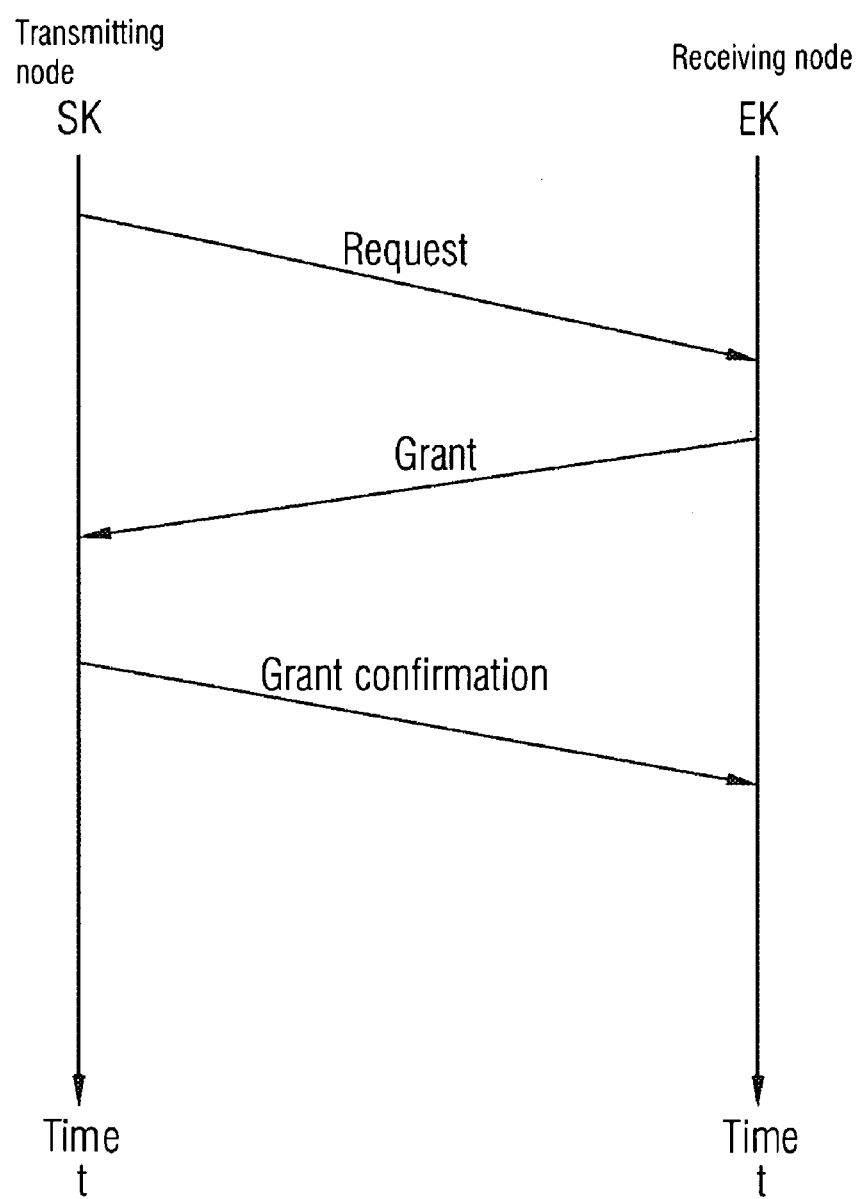
FIG. 3: shows a signal diagram for illustrating the three-way handshake mechanism used with the method according to the invention.

As illustrated schematically in FIG. 3, with the method according to the invention for broadcast transmission of data, the transmitting node first sends a broadcast request in an MSH-DSCH message in the scheduling control subframe to the receiving nodes EK, wherein the time slots TS available to the transmitting node SK for data transmission are indicated in the broadcast request. The frame illustrated in FIG. 2 has for example 252 time slots TS; it is also possible to dynamically vary the number of slots within the control subframe and within the data subframe. When sending out the broadcast request message (MSH-DSCH request IE), the transmitting node SK indicates the time slots TS that are available to itself for data transmission within the data subframe. For this purpose, the transmitting node SK adds multiple groups of time slots TS to the MSH-DSCH message which also contains the MSH-DSCH request IE. In the case of the broadcast request message, a broadcast flag or broadcast bit respectively is preferably set to indicate that it is a broadcast request message, not a unicast one.

After receiving the broadcast request, the neighboring receiving nodes EK transmit time-slot granting messages (MSH-DSCH grant IE) back to the transmitting node SK. If a receiving node EK transmits a time-slot granting message back to the transmitting node SK, the receiving node EK indicates in the time-slot granting message a group of time slots TS for the data subframe that are available both for the transmitting node SK and for said receiving node EK for data transmission, or are available to both nodes jointly for data transmission.

Ideally, therefore, the transmitting node SK receives in each case from all neighboring receiving nodes EK a time-slot granting message that contains a group of time slots TS in each case. In further time slots in the control subframe, the transmitting node SK then sends out a confirmation message (MSH-DSCH grant IE as grant confirmation), wherein indicated in the confirmation message are all groups of time slots TS that are indicated by the received grant messages from the various receiving nodes EK as jointly available with the transmitting node SK. After performing the three-way handshake mechanism illustrated in FIG. 3, the transmitting node SK then performs a broadcast transmission of the data to the receiving nodes in the jointly available time slots TS.

Every broadcast request (MSH-DSCH request IE) sent out by the transmitting node (SK) has an associated transmission ID or link ID. The broadcast transmission of data according to the invention is performed in four steps, preferably in four successive frames, as are illustrated in FIG. 2. The transmitting node SK sends out a broadcast request message in a control subframe of a first frame. It then receives the grant messages of the receiving nodes in the control subframe of the following frame. In the following frame the transmitting node sends the confirmation message to the receiving nodes EK. The data is then transmitted in the jointly available time slots TS of the data subframe contained in the next frame. The request message (request) sent out by the transmitting node SK preferably has an associated transmission ID for marking the requested transmission. If a receiving node EK receives a broadcast request which is added to an MSH-DSCH message from a transmitting node SK, and if it has jointly available time slots TS, it transmits back one or more corresponding time-slot granting messages to the transmitting node SK, wherein the time-slot granting message (MSH-DSCH grant IE) has the same transmission ID as the received request message (MSH-DSCH request IE). The grant message contains the node ID of the transmitting node SK. On the basis of the node ID it contains, other receiving nodes EK can assign the grant message to a transmitting node SK. On the basis of the transmission ID, the transmitting node recognizes which received time-slot granting messages belong to the broadcast request and which time slots TS are offered by the receiving nodes EK as jointly available for the broadcast transmission. Once the grant messages have been processed, the transmitting node SK sends one or more confirmation messages (MSH-DSCH grant IE as grant confirmation) in which all of the time slots TS belonging to the broadcast request message which are indicated as jointly available by the various receiving nodes EK are indicated.

A node identifier was preferably indicated by the sending node in each case when sending messages between the nodes so that the receiving node knows from which node it is receiving the message. Once the broadcast request message (MSH-DSCH request IE) has been sent out, the transmitting node SK temporarily stores the node identifiers of the receiving nodes EK from which it receives a corresponding time-slot granting message for the request message, which it confirms with a grant confirmation. Ideally the transmitting node SK receives at least one time-slot granting message from all receiving nodes EK. If the proportion of receiving nodes EK that do not transmit back a time-slot granting message in response to a broadcast request message of the transmitting node SK is relatively high and is above a definable threshold, the transmitting node SK retransmits the respective broadcast request message (MSH-DSCH request IE) and the broadcast procedure is repeated. This procedure is repeated until the required proportion of neighboring nodes has been reached or the broadcast has been repeated n times.

If a receiving node EK receives a request message which indicates time slots TS available to a transmitting node SK and which indicates a particular demand for transmission time slots, the receiving node EK checks whether it also has time slots TS corresponding to said time slots available. If none of the time slots TS indicated in the broadcast request message is available in the receiving node EK as a result, for example, of data being received from a third or another node, the receiving node EK does not send out any time-slot granting message.

If a receiving node EK is monitoring a time-slot granting message (MSH-DSCH grant IE) transmitted from another receiving node EK, and if the monitored time-slot granting message has the same transmission ID as the broadcast request message originally received by the monitoring receiving node EK, and if the receiver ID is identical to the node ID of the broadcaster, the monitoring receiving node EK in turn transmits a time-slot granting message with said transmission ID. Said time-slot granting message preferably indicates the same time slots TS as are indicated in the monitored time-slot granting message received by the other receiving nodes, provided said time slots are also available to the monitoring receiving node EK.

When sending out the broadcast request message, the transmitting node SK indicates one or more groups of available time slots TS, for example a range of successively arranged time slots TS within the data subframe. If multiple available time slots TS are indicated in the broadcast request message, the receiving node EK can select a time slot TS that suits it. For instance, the receiving node EK can select here a time slot TS which it has monitored in another time-slot granting message transmitted from another receiving node EK with the same transmission ID. Alternatively, the receiving node selects a time slot for which it has not monitored a time-slot granting message for another unicast data transmission or another broadcast data transmission.

The transmitting node SK sends out a confirmation message for every received time-slot granting message in which the time slot TS granted by the receiving node EK for broadcast transmission is different. However, no confirmation message is transmitted if it is a grant message for another data transmission or the transmitting node SK monitors a confirmation message containing the time slot TS in question. The transmitting node SK repeats the data transmission in every time slot granted or released for broadcast data transmission.

FIG. 4 shows an example of broadcast data transmission for illustrating the method according to the invention.

In the example shown, a transmitting node SK first sends a broadcast request message (MSH-DSCH with request IE and multiple availability IEs) which is received by all five neighboring receiving nodes EK. In the request message, the transmitting node SK indicates for example that time slots 2, 3, 5 are available to it for broadcast data transmission. In the example shown, the receiving node EK1, the receiving node EK2, the receiving node EK5 and the receiving node EK3 transmit back a time-slot granting message in which the receiving node EK1 and the receiving node EK2 indicate that time slot 2 is available to them. The receiving node EK3 indicates that time slot 5 would be possible for it, and the receiving node EK5 indicates that time slot 3 is available. The transmitting node SK evaluates the four time-slot granting messages received and confirms in a confirmation message that it would like to perform the broadcast data transmission in time slots 2, 3. In the example shown, there is no confirmation for the time slot 5 wanted by receiving node 5. The time-slot granting message is transmitted to all five receiving nodes.

The broadcast transmission of the data is then performed initially in time slot 2 so that receiving nodes EK1 and EK2 successfully receive data, while the other receiving nodes EK3, EK4, EK5 do not successfully receive the data. The data is then retransmitted or rebroadcast by the transmitting node SK in time slot 3 so that the data is now successfully received by receiving node EK5. Since not all receiving nodes EK have yet received the broadcast data, i.e. receiving nodes EK3 and EK4, the transmitting node SK transmits a new broadcast request message (request).

In the example shown, the two receiving nodes EK3, EK4 transmit time-slot granting messages (grant) for the time slot TS=5 back to the transmitting node SK. EK1, EK2, EK5 do not respond to the request message since they recognize on the basis of the sender node ID of the request message and the transmission ID it contains that they have already received the broadcast. The transmitting node SK then transmits a confirmation message for the time slot 5. Finally, the data is transmitted to the receiving nodes EK3, EK4 in the confirmed time slot 5.

FIGS. 5A, 5B show message formats as used in one embodiment of the method according to the invention.

FIG. 5A shows in Table 2 one possible data format for a request message (MSH-DSCH grant IE) according to the IEEE 802.16 standard. For example, a link ID field can be used for a transmission ID (also referred to as broadcast ID). Various transmitting nodes SK send different transmission IDs here. Every data transmission of a transmitting node SK has an individual transmission ID. Every transmitting node selects a different transmission ID for different simultaneously executed operations. One data transmission ID is preferably valid for a given predefined time period during which it cannot be used for another broadcast or neighboring link. After the validity period expires, the transmission ID can be reused for other transmissions. The transmission ID may be selected for example randomly by the transmitting node SK from a group of valid transmission IDs.

A number from [0,255] is then valid as transmission ID if it does not use the transmit link ID Xmt-Link-Id of a unicast neighboring link in the direction broadcaster SK to the neighboring node.

The demand level and demand persistence fields are used to indicate the bandwidth required. The number of required time slots TS is obtained by multiplying the value in demand level with the $i^{th}$ element from the series <0,1,2,4,8,32,128, infinite>, where i is equal to the value from demand level.

A set broadcast bit indicates whether the request IE is announcing a broadcast. If the broadcast bit is not set, this announces a unicast request IE.

FIG. 5A shows in Table 3 one possible data format for a message indicating the availability of the time slots TS. The availability message indicates a group of time slots which are possible for the transmitter of the data transmission. On the basis of its own set of available time slots TS, the receiving node then selects a range or a set of time slots that are jointly available.

FIG. 5A also shows in Table 2 one possible data format for a time-slot granting message or grant message. The direction field is preferably used here to differentiate between a time-slot granting message (grant message) and a confirmation message (grant confirmation). The link ID data field specifies the transmission ID for both a grant message and a confirmation message. The neighboring nodes adjacent to the two nodes involved in the request and granting process can monitor the request, grant and confirmation messages and update their own availability status. Independently of the other nodes, each receiving node EK selects a group of time slots TS that are available to it and sends one or more grant messages to this effect. The MSH DSCH grant IE additionally contains a receiver ID field in which the node ID of the desired receiver for the grant is entered. If the MSH DSCH grant IE is a unicast grant, an illegal value for the node ID (preferably 0 or 2^32−1) is always entered in the receiver field.

Protocol execution is divided into a reservation phase and a data transmission phase, with both phases together forming a broadcast pass. A broadcast may comprise a plurality of broadcast passes, depending on whether sufficient neighbors were reached in the passes performed. The same message types are used for reserving the bandwidth for the broadcast method as are used for the unicast reservation method. This also means that the transmission of the messages in the scheduling subframe is performed in the same way as for corresponding messages in a unicast.

The broadcaster or transmitting node SK respectively initiates the broadcast by sending a request IE in the scheduling control subframe embedded in an MSH-DSCH message. The request IE largely corresponds to the unicast request IE with the difference that the reserved bit present is used as a broadcast bit in order to mark the IE as a broadcast request. The link ID data field serves to identify the broadcast here. Said value usually serves to assign the protocol messages of a transmitter to one of its links to its neighbors. This purpose is no longer required for the broadcast since a message is always directed to all neighboring nodes. It is however necessary to differentiate between the individual broadcasts of a node, which may also be performed concurrently. In this context, therefore, said data field is called the broadcast ID. The following two demand level and demand persistence data fields contain the bandwidth required for the broadcast. Demand level indicates the number of minislots or time slots respectively to be reserved, while demand persistence indicates the duration of their validity.

In the next step, the receivers or receiving nodes EK then select a suitable interval or group from the availabilities (available intervals) of the broadcaster or transmitting node SK, which are likewise contained in the MSH-DSCH message that also contains the request IE. Said transmission interval is notified to the transmitting node SK by means of a grant IE. Every broadcast receiver EK processes the received request IE, which it can take from the MSH-DSCH message monitored in the scheduling subframe, and responds with a grant IE, provided it was able to determine a receiving interval on the basis of its availabilities. In the broadcast according the method according to the invention, however, different rules apply for the generation of the grant IE or grant message respectively than for the conventional unicast. It is necessary that all broadcast receivers EK select as few different intervals as possible. This actually requires communication between the request receivers which is not provided in the conventional protocol. In order nevertheless to obtain agreement on the time slot intervals to be used, according to the invention the following procedure is adopted. Grant IEs in MSH-DSCH messages are transmitted in the scheduling subframe. The transmissions are coordinated decentrally here and are therefore collision-free. Every neighboring node EK of the transmitter SK is therefore able to monitor said transmission. The broadcast receiver EK that has the opportunity to send the first broadcast grant IE specifies any interval that it available to it and for the reception. All neighboring nodes of said broadcast receiver EK can monitor said grant IE. The next node whose turn it is to transmit in the scheduling subframe checks the interval from the received grant IE as to whether it is also available to it. If so, it likewise selects said interval for its grant IE or grant message respectively, and transmits it as soon as it is its turn in the scheduling subframe. This procedure is continued for each broadcast receiver EK. If several received intervals are available to select for a node EK, it selects the interval that it received most often, as this is the interval that has the best prospect of actually being confirmed by the transmitting node SK, as will be described below. If no interval is available for a receiver EK, accordingly it selects a new free interval that does not overlap with any received interval. If it cannot find an interval that does not overlap with the intervals from the monitored grants, it selects any free interval. The broadcaster SK receives all grants and selects for the grant confirmation or confirmation message respectively the intervals that do not overlap. If there are overlaps with various grants however, it will confirm the interval that was contained in the most grants. Although the selection method of the receiving nodes EK is cooperative, since intervals that do not lead to conflicts are selected first, the deliberate selection of an overlapping interval can ultimately result in more nodes being reached by the broadcast because more nodes were ready to receive in this interval.

Figure 6:
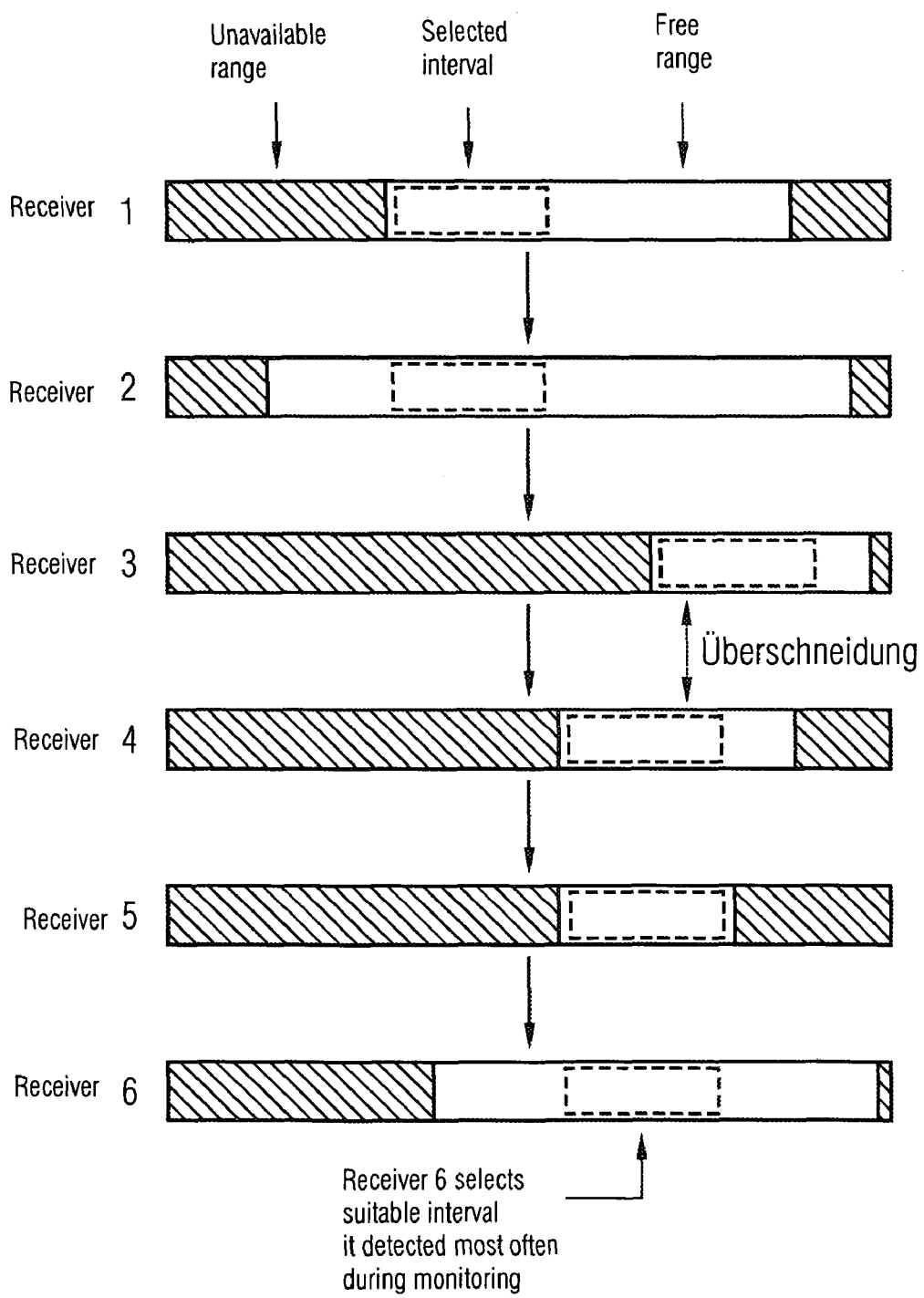
FIG. 6: shows an example of the selection of receiving intervals of broadcast receivers with the method according to the invention.

FIG. 6 shows an example of the selection of receiving intervals of broadcast receivers.

FIG. 7 shows the algorithm for determining the interval for broadcast reception. O is the set of intervals of all received grants, A is the intervals available for reception, r is the demand from the received request message. For the selection of intervals by neighboring broadcast receivers EK, however, the following problem arises. Without changing the message format of the grant IE, it is not possible to assign the grant IE unambiguously to a broadcast of a specific broadcaster SK. The problem arises because, of the monitored grant IE, only the broadcast ID as well as the sender address of the transmitter SK, that is to say of the other broadcast receiver, is known. It is true that it is possible to draw conclusions with a certain degree of probability about the originator of the broadcast on the basis of the broadcast ID. However, there is also a probability of 1:256 that the grant IE is intended for the broadcast of another broadcaster SK that coincidentally selected the same broadcast ID. To avoid this conflict, and to avoid a collision being caused with a certain degree of probability as a result of incorrectly assigning the grant IE to the broadcast, the grant IE or grant message respectively is extended to include an additional receiver ID data field which contains the node ID of the broadcaster. The combination of receiver ID and broadcast ID enables unambiguous assignment of a monitored grant IE to a particular broadcast.

The broadcaster SK monitors the grant IEs sent out; its task is then to confirm the intervals that are permitted with a grant confirmation message. For this purposes, it is first of all necessary to form the set of received intervals. Generated from said set is a list sorted by the frequency the interval is named. Said list is processed from top to bottom. The first interval is checked to see whether it is still available for the transmission. Although this attribute should be given by the selection of availabilities in the MSH-DSCH message with the request IE, it may have changed in the meantime. If it is available, it is added to the set of intervals to be confirmed. The next intervals that are successively taken from the list of received intervals are checked to see whether they do not overlap with one or more intervals from the set of intervals to be confirmed. If not, they are likewise added to said set. Otherwise they are not processed further and the grant IE of the broadcast receiver EK that used said intervals is accordingly not confirmed. A grant confirmation is sent for all intervals contained in the set of intervals to be confirmed. Said grant confirmation is a corresponding grant IE which is marked as grant confirmation. It should be noted that it can be satisfied for a request IE, whether unicast or broadcast, with multiple different intervals, that is to say multiple grant IEs. In this case it is important that a grant or grant confirmation may be sent specifically only when every individual subinterval is permitted. Specifically in the case of a broadcast, it must be ensured that only the complete bandwidth of the request is reserved. So-called grant bundles are used at both the receiving and the transmitting end for this purpose. A grant bundle is a set of subintervals which added together comprise the respective bandwidth. For the sake of simplicity, no distinction will be made between intervals and grant bundles in the text below. Grant bundles are handled analogously to intervals. It is assumed that a request can be served with a grant interval.

For receiving nodes EK that receive a grant confirmation for their selected interval, the reservation has been successful and they receive the broadcast in the respective interval. Nodes whose interval was not confirmed have the opportunity to nevertheless receive the broadcast if they are able to monitor a grant confirmation for the broadcast containing an interval in which they are likewise ready to receive. However, the problem then arises that the neighborhood of said node is not informed that said broadcast will now be received in another interval. To guarantee reception under all circumstances, the node EK can send a grant containing said new interval, the adjacent nodes will then mark the interval accordingly as occupied, and the broadcaster SK will ignore the grant. If no alternative interval can be found, the broadcast pass has failed for the node EK; in this case it must attempt to receive the broadcast in the next pass.

In the data transmission phase, the broadcaster or transmitting node SK respectively repeatedly transmits the data in each reserved interval. It is vital here that the receiving nodes EK can assign the data received to a confirmed interval. Since the protocol information only discloses that it is a broadcast, it must be ensured that the repeated transmissions are received and processed only once as such in each case. The received data is assigned to the confirmed interval on the basis of the minislot number or time slot number and the frame number at the time of reception.

A broadcast consists of multiple passes with which as many neighboring nodes as possible are to be reached. However, for a variety of reasons this does not always succeed on the first pass. In order nevertheless to reach all neighbors, the pass is repeated. Once the reservation phase of a broadcast pass has been completed, the broadcaster SK determines the number of nodes in the neighborhood reached, and determines from that the proportion of neighboring nodes reached. If the proportion exceeds a certain limit or threshold, the broadcast is deemed to have been successful and need not be repeated. The number of neighboring nodes reached can be determined on the basis of the grant messages that were sent from each neighboring node and which can be assigned to a particular neighboring node on the basis of their sender address. For all neighboring nodes whose intervals were confirmed by a grant confirmation, it can be assumed that they also receive the broadcast correctly. By virtue of the characteristics of the 802.16 MAC, the exact number of neighboring nodes is known. As nodes whose intervals were not confirmed can nevertheless receive the broadcast in a monitored alternative interval, the calculated number of neighbors reached may be lower than the actual number. If the necessary limit for a successful broadcast has not been reached for a broadcast pass, and if the broadcast has hitherto been repeated fewer than n times, a new broadcast pass is begun with the same broadcast ID. Said new pass is executed in the same way as the first one. Neighboring nodes that have already received the broadcast or, respectively, have received a confirmed interval for data reception, ignore the broadcast request. They can recognize the broadcast already received on the basis of the broadcast ID. In some circumstances a broadcaster SK may assume too low a number of neighbors has been reached because it erroneously assumes that not all neighboring nodes have been reached with the broadcast. This can happen if one or more neighboring nodes use an alternative receiving interval. In this case, no neighboring node would reply to the request IE with a grant and the broadcaster SK would therefore not repeat the broadcast again. Apart from an unnecessarily sent request IE, this would have no negative effects.

The individual broadcasts of a node can be differentiated on the basis of the broadcast ID. The same broadcast ID is used for every broadcast pass of a broadcast so that the nodes that have already received the broadcast do not confuse the broadcast with a new broadcast. Owing to the limited number of possible broadcast IDs, after a certain time used broadcast IDs must be reused. It must be ensured here that sufficient time elapses between two usages which enables the broadcast receiver EK to recognize that the broadcast has been completed. A broadcast can be recognized as completed by the broadcast receivers EK if it has been repeated n times, or no repeat has occurred for a certain period (because the broadcaster has reached all broadcast receivers).

The bandwidth for a broadcast is determined analogously for a unicast, with the difference that, in contrast to a unicast, the bandwidth for the broadcast may not be valid for an unlimited duration. Before the bandwidth calculation is explained, the general problems of bandwidth determination will first be discussed. The way in which the required bandwidth is indicated in the request IE in 802.16 mesh mode according to IEEE standard 802.16-2004 has to date been rather poorly resolved. The node requesting bandwidth, that is to say the transmitter SK, indicates in the demand level field in the request IE the number of minislots or demand persistence time slots respectively the number of frames for which this reservation is to be valid. The product of the number of minislots TS required and the persistence of the reservation gives the volume of data to be transmitted. For reservations, the transmitter SK must decide whether it wishes to transmit the volume of data that it has to send as quickly as possible in many time slots TS that are valid for only a few frames, or whether it would rather transmit the data more slowly in a few time slots TS, but which are then valid over a greater number of frames. In addition, demand persistence has fixed graduations. There are two aims when allocating bandwidth, but achieving them results in a conflict of aims. The first aim is to minimize the data transmission delay. If one interprets an interval as an area that can be entered in a Cartesian coordinate system, the demand level corresponds to the x direction and demand persistence corresponds to the y direction. To minimize the delay, it is advisable for the request to have as wide and low a format as possible. The second aim is to optimize utilization of the transmission channel. To achieve this aim, the area of the request should correspond as closely as possible to the volume that is actually required. This means that the product of demand level and demand persistence should correspond to the required volume as far as possible. It is difficult to determine demand level and demand persistence in such a way that both aims can be achieved. Since the demand for bandwidth should be satisfied, the product of the two values must at least give the amount that is required. To achieve the second aim, two factors are to be found for which the difference between reserved and required bandwidth is as low as possible. A further difficulty is that both factors are discrete and the second factor (demand persistence) can only be selected. This is where the conflict of aims arises. The factors that match the demand as exactly as possible often do not minimize the transmission delay. To minimize the transmission delay, demand persistence should be as low as possible. This can however mean that a large portion of the reserved bandwidth is not used. This excess cannot be used for other transmissions either.

An example of this conflict is shown below:

| Bandwidth required: | 640 minislots |
| Minislots per frame: | 98 minislots |
| Frame duration: | 10 ms |

Optimization of utilization:

| Demand level: | 5 minislots |
| Demand persistence: | 128 frames |
| Utilization: | 100 percent |
| Delay: | 1280 ms |

Optimization of transmission delay:

| Demand level: | 98 minislots |
| Demand persistence: | 8 frames |
| Utilization: | 81.6 percent |
| Delay: | 80 ms |

The conventional bandwidth reservation in 802.16 is also poor for another reason however. The transmitter SK indicates with demand level and demand persistence, i.e. width and height, its bandwidth required in the request IE. However, it does not know whether the receiver EK can satisfy this bandwidth format. It may be the case that the receiver EK actually has sufficient bandwidth available, but does not have an interval free that has this aspect ratio. If it does not have this, it is not specified how to proceed in this situation. This is a general problem with reservation in 802.16 and does not just affect broadcasting.

In order to determine the bandwidth therefore, according to the invention the following procedure is followed, with the semantics of demand level and of demand persistence being modified.

With the method according to the invention, the decision as to which format a bandwidth request has is no longer made by the transmitter SK (broadcaster), but by the (broadcast) receiver EK. Likewise, a bandwidth request can be satisfied with multiple intervals (grant messages). The transmitter SK indicates the required bandwidth as exactly as possible in the demand level and demand persistence fields, while the receiver EK decides which format the intervals have that it sends in its grant. There is an agreement here that the intervals comprise at least the required bandwidth, with optimization of the transmission delay and utilization. In order to reserve the bandwidth, the transmitter SK or broadcaster respectively determines the values for demand level and demand persistence according to the calculation rule below. The receiver EK now selects one or more intervals from its availabilities that satisfy the received request and also optimize the transmission delay and utilization aims.

Calculation rule for determining the bandwidth required for request IEs:

```
function GETREQUESTINTERVAL(demand)
- bestRange = -1
- bestPersistence = -1
- bestDemand = -1
- for all i in <1, 2, 4, 8, 32, 128> do
    i.    thisRange = ceil (ddemand / ie)
    ii.   thisDemand = thisRange · i
    iii.  if thisRange <= 98 && (bestPersistence = -1 || thisDemand <
          bestDemand) then
    iv.   bestRange = thisRange
    v.    bestPersistence = i
    vi.   bestDemand = thisDemand
- end if
end for
return <bestRange, bestPersistence>
end function
```

The broadcast method according to the invention presented is just as collision-resistant as data transmission with a unicast. On the basis of the mechanisms for collision avoidance, which are applied virtually identically in broadcasting as in unicasting, it will now be shown that the collision resistance also applies to broadcasting. With the aid of the three-way handshake, not only transmission intervals for data are negotiated, but also the neighborhood is notified that data is being transmitted. Each node that monitors a grant from a neighboring node marks the respective interval as available for reception (only reception is possible in the minislots marked as available for reception). This means that the node may only receive in this interval, as it is within range of the receiver. If it were nevertheless to transmit, a collision would result at its neighboring node, so that the latter would not be able to receive. If on the other hand the node monitors an interval from a grant confirmation, it must mark this interval as available for transmission (only transmission is possible in the minislots marked as available for transmission), as it is within range of a transmitter SK and therefore cannot receive data from another node. If a node can monitor both grant and grant confirmation, it is within range of transmitter SK and receiver EK, and therefore can neither send nor receive in the respective interval. The interval is marked as unavailable. A node that performs data transmission itself as transmitter or receiver is unavailable for the transmission interval, since nodes are unable to send and receive simultaneously here.

By using these measures, it is not possible for receiving at one node to be disturbed by transmitting at another node. In broadcasting, however, there is the variation of deliberately selecting for one's own grant IE the same interval that a neighboring node previously used for the same broadcast. This enables multiple nodes to receive simultaneously in one interval.

Figure 8:
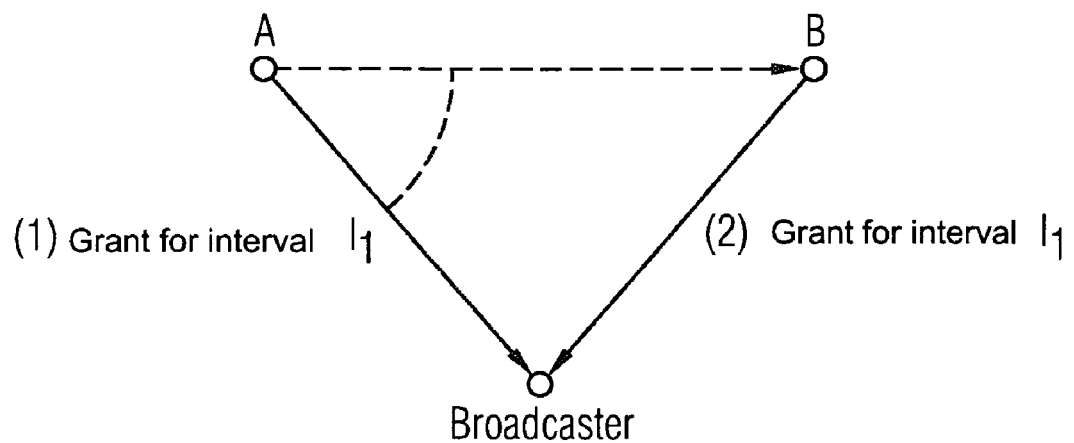
FIG. 8: shows a diagram for illustrating the functioning of the method according to the invention.

In FIG. 8, node B selects for its grant message the same interval that it previously monitored from node A. In this case no collision results from using the same intervals in two different grants, since the transmitter, namely the broadcaster SK, is the same for both receivers EK. It is also not possible for a collision to result from a further transmitter from the neighborhood of A or B, as said transmitter must have likewise received the sent grant from A and B and therefore is informed that both nodes A and B want to receive in the interval in question. The situation may also occur that node A selects an interval in which node B cannot receive; node B would accordingly select another interval for its grant. If the broadcaster SK now confirms the selected interval of node A with a grant confirmation, reception at node B would be disturbed. In this case, however, this would not be a disadvantage for node B. Since node B cannot receive, this means that a node in the neighborhood of node B is currently transmitting. However, this would not cause a problem for node B, because node B cannot be the recipient of this transmission. If it were the recipient, it would have to have received the grant for the interval in which the data transmission would take place from the broadcaster node SK, which would have meant that the latter would not have confirmed said interval with a grant confirmation. The situation described occurs not only in the case of a broadcast, it can also happen in the same way for a unicast. A problem with collisions could only arise if, as a result of interference or different transmitting ranges, the MSH-DSCH messages are not received. This would also be a general problem and would therefore equally affect both unicasting and broadcasting. The broadcast according to the invention is therefore exactly as collision-resistant as a unicast.

Often it is not possible to reach all neighbors with only one interval in one pass, since normally not all neighboring nodes are able to receive at the same time. It could be the case that a broadcast method that permits multiple transmission intervals and multiple passes for a broadcast leads to an inefficient utilization of the available bandwidth of the channel. In the proposed method, the broadcast receivers EK are enabled to use the monitored intervals of other neighboring nodes for their own reception. As a result, the number of different intervals in which broadcast transmission takes place is greatly reduced. In a network having high connectivity within the neighborhood it can therefore be assumed that the available minislots of the nodes will be very similar. This means that the nodes can agree very well on one or few intervals, as they have minislots or time slots respectively available at similar times. In a less dense network, these effects may occur to a lesser extent, but in general the competition for available minislots should be less pronounced here. This would balance out the effects of multiple broadcast transmissions again.

The duration of the three-way handshake in the broadcast according to the invention can be readily compared with the duration in a unicast. Although more than two nodes are usually involved in the handshake in broadcasting, it can be shown that in some circumstances the handshake in a unicast takes at least as long as for a broadcast. The duration of the three-way handshake in unicasting encompasses the time between the MSH-DSCH message with the request IE being sent out with the request IE by the transmitter SK and sending out the grant IE with the grant confirmation likewise by the transmitter SK. Each node may only send out an MSH-DSCH message if it has permission to do so. Said permission depends on whether it wins a mesh election, the outcome of which can be determined decentrally by every node. It may only participate in said mesh election if it is authorized (eligible) to do so. In the underlying draft of 802.16 it is provided that a node becomes eligible after a given hold off time following a completed transmission in the control subframe. The time of transmission in the control subframe cannot be determined in advance, so that the length of the three-way handshake cannot be predicted. In principle, all nodes successively get a turn, so that it can be assumed that a node only gets an opportunity to transmit again once all other nodes have already transmitted. The duration of a (broadcast) handshake is therefore based on the temporal position of the opportunities to transmit in the control subframe. It would therefore also be possible for a unicast handshake to take just as long as a single broadcast pass. The repetition of the handshake analogously to the repetition of a broadcast pass may be necessary for a unicast. This would be the case if the handshake failed.

The extension of 802.16 mesh mode to include a broadcast method according to the invention is readily compatible with the performance of a unicast. The key point here is that the assignment of request IE and grant IE to transmitter SK and receiver EK continues to be possible without confusion. In a unicast a request IE or grant IE is usually assigned to the sender address and the link ID to a connection between two nodes. The transmitter SK enters the link ID in the request or grant IE respectively. The link ID is exchanged during the link establishment of the two nodes and can also only be assigned to a connection by said two nodes. A separate link ID is used for each direction of the connection. A broadcast request IE or grant IE is likewise identified on the basis of the sender address and link ID, which in this context is referred to as the broadcast ID. It is important here that a broadcaster does not use any broadcast ID identical to a link ID that it has used for one of its connections. Both values are stored in the same data field. Request IEs that are sent by a broadcaster can never be confused with a request IE for a connection to another node, because firstly the broadcast is marked by the broadcast bit, and also because the broadcaster SK only ever selects broadcast IDs that are not used for a connection to another node. There is however one possibility of incorrect assignment, namely when a broadcast receiver EK receives a broadcast, the broadcast ID of which has the same value as the link ID of its outgoing connections. In this case a grant IE sent as a response to a broadcast request would be erroneously understood by the connection partner as being directed to it. It cannot be assumed either that said connection partner is likewise a broadcast receiver of said broadcast. To avoid this problem, it is possible for each node to set the link IDs on a blacklist used by its neighboring nodes for their connections, although this reduces the number of available broadcast IDs. Instead the grant IEs of unicast and broadcast receivers are identified on the basis of the receiver node ID, which was introduced because of the broadcast and accordingly is also present in a unicast grant IE. A grant IE is identified as a unicast grant if the IE is marked as a grant (as opposed to a grant confirmation), and the receiver node ID field is the same as the node ID of the sender of the grant IE. It is identified as a broadcast grant if it is marked as a grant and the receiver node ID has a value unequal to the sender node ID. Since a broadcast receiver EK does not send a grant for its own broadcast, confusion can no longer arise. No confusion can arise for the sending of grant confirmations as the latter in turn contains a broadcast ID which is not used in any combination of sender address and link ID for a connection to a node.

The method according to the invention constitutes a reliable mechanism for transmitting broadcast and multicast messages in mesh networks based on the IEEE 802.16 standard. Data delivery is also guaranteed (reliable broadcast). Reservation of the time slots TS is coordinated so that the number of reserved time slots TS for broadcast data transmission is minimized in the method according to the invention.

The invention claimed is:

1. A method for transmission of data comprising:
a transmitting node sending a request message to a plurality of receiving nodes, the request message specifying at least one specified time slot that is available for the transmitting node to transmit a data transmission;
a first receiving node of the plurality of receiving nodes transmitting a first time-slot grant message in response to the request message, the first time-slot grant message indicating at least one first time slot that is available for the first receiving node to receive a data transmission from the transmitting node, the at least one first time slot matching at least one time slot specified in the request message;
a second receiving node of the plurality of receiving nodes receiving the first time-slot grant message and evaluating the first time-slot grant message to determine if the at least one first time slot is available for the second receiving node to receive the data transmission from the transmitting node;
the second receiving node transmitting a second time-slot grant message in response to the request message and based on the evaluating of the first time-slot grant message, the second time-slot grant message indicating at least one second time slot that is available for the second receiving node to receive the data transmission from the transmitting node, the at least one second time slot matching at least one time slot specified in the request message;
the transmitting node receiving the first and second time-slot grant messages and evaluating the first and second time-slot grant messages to determine at least one available time slot for transmitting the data transmission;
the transmitting node transmitting a confirmation message to the first and second receiving nodes in response to the first and second received time-slot grant messages, the confirmation message confirming the at least one available time slot that is to be used for transmitting the data transmission from the transmitting node;
the transmitting node transmitting the data transmission in the at least one available time slot; and
wherein the request message comprises a demand level and a demand persistence.

2. The method of claim 1 wherein the at least one first time slot and the at least one second time slot are the same or the at least one first time slot and the at least one second time slot are not the same.

3. The method of claim 1 wherein the second receiving node evaluates the first time-slot grant message by selecting at least one time slot of the first time-slot message that is available to the second receiving node for the at least one second time slot.

4. The method of claim 1 further comprising the transmitting node determining a number of receiving nodes that do not transmit a time-slot grant message in response to the request message, if the number of receiving nodes that do not transmit is greater than a predetermined threshold the transmitting node retransmitting the request message to the plurality of receiving nodes.

5. The method of claim 4 further comprising the transmitting node retransmitting the request message until the number of receiving nodes that do not transmit is below the predetermined threshold or the request message is retransmitted a predetermined number of times.

6. The method of claim 1 wherein the transmitting node transmitting the data transmission in the at least one available time slot comprises the transmitting node transmitting the data transmission to the first receiving node in a time slot identified in the first time-slot grant message and after the data transmission to the first receiving node is complete, transmitting the data transmission in a time slot identified in the second time-slot grant message, wherein the first time slot differs from the second time slot.

7. The method of claim 1 further comprising the transmitting node storing a node ID of the first receiving node and a node ID of the second receiving node in response to the transmitting node receiving the first time-slot grant message and the second time-slot grant message.

8. The method of claim 1 wherein the plurality of receiving nodes comprise a network, the network comprising a mesh network, a WiMax network, or a fixed network, and wherein the request message is a broadcast message or a unicast message.

9. The method of claim 1 further comprising the first and second receiving nodes determining the at least one first time slot and the at least one second time slot such that the at least one first time slot and the at least one second time slot each satisfy a bandwidth request specified in the request message and such that the at least one first time slot and the at least one second time slot each optimize a transmission delay and utilization based on the bandwidth request.

10. The method of claim 1 wherein each grant message comprises a node ID of the transmitting node, the method further comprising each of the plurality of receiving nodes assigning each grant message to the transmitting node based on the node ID of the transmitting node.

11. The method of claim 1 wherein the transmitting node and the receiving nodes are mobile terminals or base stations.

12. A method for data transmission comprising:
a transmitting node sending a first request message to a plurality of receiving nodes, the first request message indicating a requested time slot that is requested for a data transmission;
a first receiving node of the plurality of receiving nodes transmitting a first time-slot grant message in response to the first request message, the first time-slot grant message indicating a first time slot that is available for the first receiving node to receive the data transmission from the transmitting node, the first time slot matching a time slot that is requested in the first request message;
a second receiving node transmitting a second time-slot grant message in response to the first request message, the second time-slot grant message indicating that the first time slot is available for the second receiving node to receive the data transmission from the transmitting node;
a third receiving node transmitting a third time-slot grant message in response to the first request message, the third time-slot grant message indicating a second time slot that is available for the third receiving node to receive the data transmission from the transmitting node, the second time slot matching a time slot that is requested in the first request message, the second time slot being different from the first time slot;
the transmitting node receiving the first, the second, and the third time-slot grant messages;
the transmitting node transmitting confirmation messages to the first, second, and third receiving nodes in response to the first, the second, and the third received time-slot grant messages, the confirmation messages confirming that the first time slot is to be used for the data transmission to the first and second receiving nodes and the second time slot is to be used for transmitting the data transmission to the third receiving node; and
the transmitting node transmitting the data transmission in the first time slot to the first and second receiving nodes and the transmitting node transmitting the data transmission in the second time slot to the third receiving node after completing the transmission in the first time slot;
the transmitting node transmitting a second request message to the plurality of receiving nodes, the second request message indicating at least one requested time slot that is requested for the data transmission;
a fourth receiving node transmitting a fourth time-slot grant message in response to the second request message, the fourth time-slot grant message indicating a third time slot being available for the fourth receiving node to receive the data transmission from the transmitting node, the third time slot matching at least one time slot requested in the second request message, the third time slot differing from the first time slot and also differing from the second time slot;
the transmitting node transmitting a second confirmation message to the fourth receiving node in response to the fourth received time-slot grant message, the confirmation message confirming that the third time slot is to be used for transmitting the data transmission to the fourth receiving node;
the transmitting node transmitting the data transmission in the third time slot to the fourth receiving node.

13. The method of claim 12 further comprising the plurality of receiving nodes determining a transmission ID of the second request message and if the transmission ID of the second request message matches a transmission ID of the first request, each receiving node that received the data transmission foregoing transmitting a further time-slot grant message in response to the second request message.

14. A system for transmission of data comprising:
a transmitting node;
a plurality of receiving nodes; and
the transmitting node sending a request message to the plurality of receiving nodes;
a first receiving node of the plurality of receiving nodes transmitting a first time-slot grant message in response to the request message, the first time-slot grant message indicating at least one first time slot that is available for the first receiving node to receive a data transmission from the transmitting node;
a second receiving node of the plurality of receiving nodes receiving the request message,
if the second receiving node determines at least one second time slot that is available for the second receiving node to receive a data transmission from the transmitting node in response to the request message:
the second receiving node transmitting a second time-slot grant message in response to the request message, the second time-slot grant message indicating the at least one second time slot that is available for the second receiving node to receive the data transmission from the transmitting node,
the transmitting node receiving the first and second time-slot grant messages and evaluating the first and second time-slot grant messages to determine at least one available time slot for transmitting the data transmission,
the transmitting node transmitting a confirmation message to the first and second receiving nodes in response to the first and second received time slot-grant messages, the confirmation message confirming the at least one available time slot that is to be used for transmitting the data transmission from the transmitting node to the first receiving node and the second receiving node, and
the transmitting node transmitting the data transmission in the at least one available time slot; and
if the second receiving node does not determine that the at least one second time slot is available for the second receiving node to receive the data transmission from the transmitting node:

the second receiving node forgoing transmitting the second time-slot grant message in response to the request message, the transmitting node receiving the first time-slot grant message and evaluating the first time-slot grant message to determine the at least one available time slot for transmitting the data transmission, the transmitting node transmitting a confirmation message to the first receiving node in response to the first received time-slot grant message, the confirmation message confirming the at least one available time slot that is to be used for transmitting the data transmission from the transmitting node to the first receiving node, and the transmitting node transmitting the data transmission in the at least one available time slot; and wherein the first and second receiving nodes determining the at least one first time slot and the at least one second time slot such that the at least one first time slot and the at least one second time slot satisfy a bandwidth request specified in the request message and such that the at least one first time slot and the at least one second time slot optimize a transmission delay and utilization based on the bandwidth request.

15. The system of claim 14 wherein the transmitting node determining a number of receiving nodes that do not transmit a time slot-grant message in response to the request message, if the number of receiving nodes that do not transmit is greater than a predetermined threshold, the transmitting node retransmitting the request message to the plurality of receiving nodes.

16. The system of claim 14 wherein the transmitting node retransmitting the request message until the number of receiving nodes that do not transmit is below the predetermined threshold or the request message is retransmitted a predetermined number of times.

17. The system of claim 14 wherein the at least one first time slot, the at least one second time slot, and the at least one available time slot are the same or the at least one first time slot and the at least one second time slot are not the same.

18. The system of claim 14 wherein the second receiving node determines the at least one second time slot is available to the second receiving node and the second receiving node evaluating the first time-slot grant message and selecting at least one time slot of the first time-slot grant message that is available to the second receiving node as the at least one second time slot.

* * * * *